(12) United States Patent
Liu et al.

(10) Patent No.: US 10,642,981 B2
(45) Date of Patent: May 5, 2020

(54) CHECKING METHOD, CHECKING DEVICE AND CHECKING SYSTEM FOR PROCESSOR

(71) Applicant: Wuxi Research Institute of Applied Technologies Tsinghua University, Wuxi, Jiangsu (CN)

(72) Inventors: Leibo Liu, Beijing (CN); Ao Luo, Beijing (CN); Shaojun Wei, Beijing (CN)

(73) Assignee: Wuxi Research Institute of Applied Technologies Tsinghua University, Wuxi, Jiangsu (CN)

( * ) Notice: Subject to any disclaimer, the term of this patent is extended or adjusted under 35 U.S.C. 154(b) by 56 days.

(21) Appl. No.: 15/895,992

(22) Filed: Feb. 13, 2018

(65) Prior Publication Data

US 2018/0239899 A1 Aug. 23, 2018

(30) Foreign Application Priority Data

Feb. 20, 2017 (CN) .......................... 2017 1 0089783
Aug. 3, 2017 (CN) .......................... 2017 1 0659429

(51) Int. Cl.
G06F 21/56 (2013.01)
G06F 21/52 (2013.01)
G06F 21/57 (2013.01)

(52) U.S. Cl.
CPC ............ *G06F 21/567* (2013.01); *G06F 21/52* (2013.01); *G06F 21/56* (2013.01); *G06F 21/57* (2013.01); *G06F 21/577* (2013.01)

(58) Field of Classification Search
CPC ...... G06F 21/567; G06F 21/57; G06F 21/577; G06F 21/52; G06F 21/56
See application file for complete search history.

(56) References Cited

U.S. PATENT DOCUMENTS 6,751,751 B1 6/2004 Murray et al.
6,757,831 B1 * 6/2004 Folmsbee ........... G06F 9/30145
712/E9.028

(Continued)

FOREIGN PATENT DOCUMENTS

CN 1558605 A 12/2004
CN 103002131 A 3/2013

(Continued)

OTHER PUBLICATIONS

Ngo, Xuan Thuy, et al. "Hardware property checker for run-time hardware trojan detection." 2015 European Conference on Circuit Theory and Design (ECCTD). IEEE, 2015. (pp. 1-4). (Year: 2015).*

(Continued)

*Primary Examiner* — Kari L Schmidt
(74) *Attorney, Agent, or Firm* — Fish & Richardson P.C.

(57) ABSTRACT

A checking method for a processor is provided. The checking method first determines whether a checked processor satisfies a security-sensitive condition including one or more of security-sensitive instruction, processor running mode, security-sensitive input/output operation, security-sensitive application, and user-defined security level. Then, the checking method checks the checked processor according to a determination result, which further includes: when the checked processor satisfies the security-sensitive condition, checking the checked processor according to a first checking mode; and when the checked processor does not satisfy the security-sensitive condition, checking the checked processor according to a second checking mode; wherein for the same running process of the checked processor, a total checking length of the first checking mode is longer than that of the second checking mode. Also provided is a checking device for a processor and a checking system for a processor.

18 Claims, 7 Drawing Sheets

(56) References Cited

U.S. PATENT DOCUMENTS

| | | | |
|---|---|---|---|
| 7,188,219 B2 | 3/2007 | Jeddeloh | |
| 7,373,521 B1 | 5/2008 | Kawahara | |
| 7,664,937 B2* | 2/2010 | Jacob | G06F 21/14 712/205 |
| 7,941,569 B2 | 5/2011 | Parthasarathy et al. | |
| 8,149,844 B1* | 4/2012 | Roskind | G06F 8/65 370/241 |
| 8,336,767 B1 | 12/2012 | Graef et al. | |
| 8,510,596 B1* | 8/2013 | Gupta | G06F 11/073 714/15 |
| 8,533,834 B1* | 9/2013 | Wong | H04L 63/14 709/217 |
| 8,713,370 B2 | 4/2014 | Millet et al. | |
| 8,832,827 B2* | 9/2014 | Herscovitz | G06F 21/567 726/22 |
| 8,996,817 B2 | 3/2015 | Bushen | |
| 9,037,895 B2* | 5/2015 | Sethumadhavan | G06F 21/76 713/502 |
| 9,069,938 B2* | 6/2015 | Moritz | G06F 9/3879 |
| 9,069,953 B2* | 6/2015 | Bellocchio | G06F 21/55 |
| 9,098,700 B2* | 8/2015 | Sethumadhavan | G06F 9/30145 |
| 9,183,606 B1* | 11/2015 | Paczkowski | G06T 1/20 |
| 9,268,959 B2 | 2/2016 | Paczkowski et al. | |
| 9,275,238 B2 | 3/2016 | Wang | |
| 9,747,446 B1* | 8/2017 | Pidathala | G06F 21/566 |
| 9,830,269 B2 | 11/2017 | McKean et al. | |
| 9,940,460 B1 | 4/2018 | Derbeko et al. | |
| 10,078,459 B1 | 9/2018 | Natanzon et al. | |
| 2004/0034794 A1* | 2/2004 | Mayer | G06F 21/567 726/23 |
| 2005/0229164 A1* | 10/2005 | Giraud | G06F 11/0757 717/130 |
| 2006/0090209 A1* | 4/2006 | Garay | G06F 21/57 726/26 |
| 2009/0307770 A1* | 12/2009 | Harris | G06F 11/3644 726/22 |
| 2010/0017605 A1* | 1/2010 | Chieze | H04N 7/1675 713/168 |
| 2010/0083387 A1 | 4/2010 | Rodgers et al. | |
| 2010/0192194 A1* | 7/2010 | Tan | G06F 21/6218 726/1 |
| 2012/0131387 A1* | 5/2012 | Salloum | G06F 11/3688 714/38.1 |
| 2013/0238904 A1* | 9/2013 | Salgado | G06F 21/52 713/187 |
| 2014/0059688 A1* | 2/2014 | Margalit | G06F 21/561 726/24 |
| 2014/0101373 A1 | 4/2014 | Lee | |
| 2014/0380474 A1* | 12/2014 | Paithane | H04L 63/145 726/23 |
| 2015/0020211 A1 | 1/2015 | Lai et al. | |
| 2016/0042179 A1* | 2/2016 | Weingarten | G06F 21/566 726/23 |
| 2016/0098565 A1* | 4/2016 | Vedula | G06F 21/577 726/24 |
| 2016/0275289 A1* | 9/2016 | Sethumadhavan | G06F 21/552 |
| 2016/0357660 A1* | 12/2016 | Dean | G06F 11/3692 |
| 2016/0357966 A1* | 12/2016 | Porat | G06F 21/552 |
| 2017/0052868 A1 | 2/2017 | Robertson et al. | |
| 2017/0228562 A1* | 8/2017 | Guilley | G06F 11/263 |
| 2017/0235961 A1* | 8/2017 | August | G06F 21/75 713/189 |
| 2017/0286670 A1* | 10/2017 | Artman | G06F 21/552 |
| 2017/0310688 A1* | 10/2017 | Lecomte | G09C 1/00 |
| 2017/0315818 A1 | 11/2017 | Shivanna et al. | |
| 2017/0329966 A1* | 11/2017 | Koganti | G06F 21/554 |
| 2018/0032726 A1* | 2/2018 | Parinov | H04L 63/1408 |
| 2018/0032760 A1* | 2/2018 | Hu | G06F 21/556 |
| 2018/0034793 A1* | 2/2018 | Kibalo | G06F 21/575 |
| 2018/0089099 A1 | 3/2018 | Raj et al. | |

FOREIGN PATENT DOCUMENTS

| | | |
|---|---|---|
| CN | 103106368 A | 5/2013 |
| CN | 103186435 A | 7/2013 |
| CN | 103676927 A | 3/2014 |
| CN | 104766166 A | 7/2015 |
| CN | 105224856 A | 1/2016 |
| CN | 105700999 A | 6/2016 |
| CN | 106355338 A | 1/2017 |
| CN | 108345791 A | 7/2018 |
| GB | 1282628 A | 7/1972 |

OTHER PUBLICATIONS

Suh, G. Edward, et al. "AEGIS: architecture for tamper-evident and tamper-resistant processing." ACM International Conference on Supercomputing 25th Anniversary Volume. pp. 357-368. 2003. (Year: 2003).*

Hou, Yumin, et al. "On-Chip Analog Trojan Detection Framework for Microprocessor Trustworthiness." IEEE Transactions on Computer-Aided Design of Integrated Circuits and Systems 38.10 (2018): 1820-1830. (Year: 2018).*

Elnaggar, Rana, Krishnendu Chakrabarty, and Mehdi B. Tahoori. "Run-time hardware trojan detection using performance counters." 2017 IEEE International Test Conference (ITC). pp. 1-10. IEEE, 2017. (Year: 2017).*

Arora, Divya, et al. "Secure embedded processing through hardware-assisted run-time monitoring." Design, Automation and Test in Europe. 99,178-183. IEEE, 2005. (Year: 2005).*

Chinese Application No. 201710659429.5, Notice on Granting the Patent Right for Invention, dated Jan. 14, 2019, with translation, 3 pages.

Chinese Application No. 201710659429.5, Second Office Action, dated Nov. 19, 2018, with translation, 9 pages.

Chinese Application No. 201710659429.5, First Office Action, dated Sep. 12, 2018, with translation, 14 pages.

Chinese Patent Application 201710659429.5, First Office Action dated Sep. 4, 2018 with translation, 14 pages.

Zhang et al., "Detrust: Defeating Hardware Trust Verification with Stealthy Implicitly-Triggered Hardware Trojans", Proceedings of the 2014 ACM SIGSAC Conference on Computer and Communications Security, 2014, pp. 153-166.

U.S. Appl. No. 15/894,042, Office Action dated Jul. 8, 2019, 27 pages.

Chinese Patent Application No. 201710316463.2, First Office Action dated Sep. 3, 2018, 12 pages.

* cited by examiner

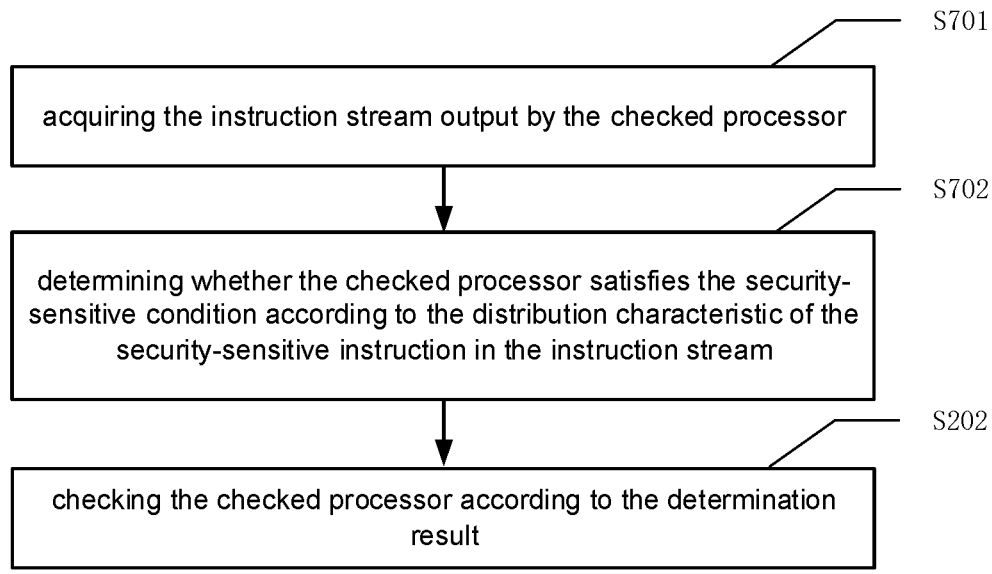
Figure 7
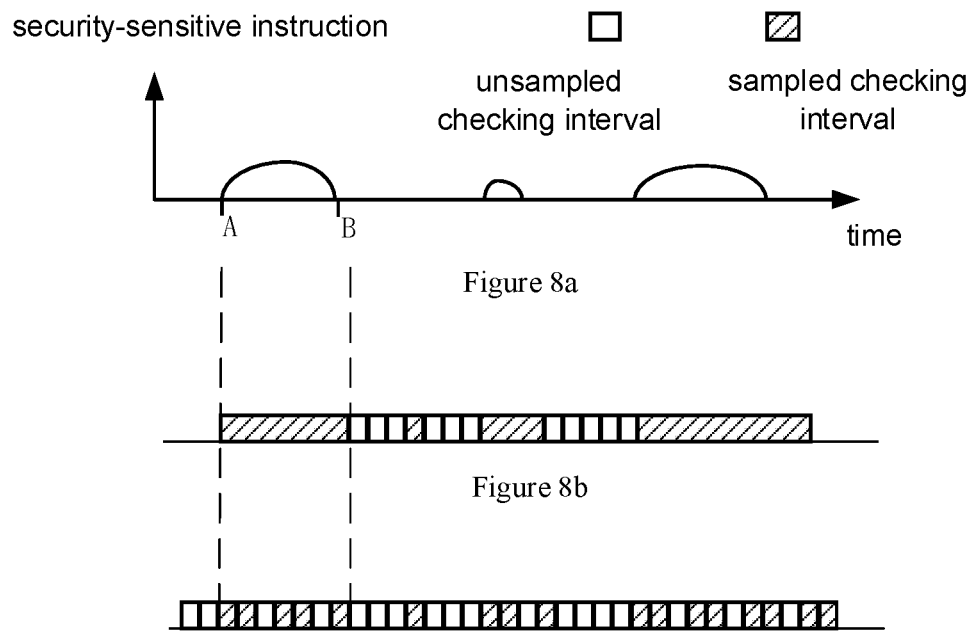
Figure 8a
Figure 8b
Figure 8c

CHECKING METHOD, CHECKING DEVICE AND CHECKING SYSTEM FOR PROCESSOR

CROSS-REFERENCE TO RELATED APPLICATION(S)

This application claims priority to a Chinese Patent Application No. 201710089783.9, filed with the Chinese Patent Office on Feb. 20, 2017 and entitled "checking method, checking device and system for determining security of a processor" and a Chinese Patent Application No. 201710659429.5, filed with the Chinese Patent Office on Aug. 3, 2017 and entitled "checking method, checking device and checking system for processor", which is incorporated herein by reference entirely.

TECHNICAL FIELD

The present invention relates to a checking method, checking device and checking system for a processor.

BACKGROUND

With the large-scale application of new technologies such as network informatization, information security has become an increasingly serious problem. Usually information security we discuss is limited to network security, software security and so on, but recent studies have shown that hardware security should also be of concern. Hardware design scale is increasing with a hardware design level, making hardware Trojans possible: factors such as current diversified sources of hardware IP (Intellectual Property) used in large-scale circuits represented by CPU (Central Processing Unit), complication of a hardware design process, refined division of the design and manufacturing process and the like result in a decrease in security controllability of hardware final products. The possibility of being implanted with malicious Trojans or loopholes (hereinafter simply referred to as Trojans) in the design increases, and an increase in hardware scale also increases the difficulty in identifying and discovering Trojans. In recent years, with the development of information security concept, hardware security has become a research hotspot of information security. Therefore, it is urgent to design a hardware security checking scheme to improve the efficiency of security checking.

SUMMARY

One aspect of the present disclosure provides a checking method for a processor. The method comprises determining whether a checked processor satisfies a security-sensitive condition including one or more of security-sensitive instruction, processor running mode, security-sensitive input/output operation, security-sensitive application, and user-defined security level; and checking the checked processor according to a determination result. Among others, the checking the checked processor according to the determination result comprises: when the checked processor satisfies the security-sensitive condition, checking the checked processor according to a first checking mode; and when the checked processor does not satisfy the security-sensitive condition, checking the checked processor according to a second checking mode. For the same running process of the checked processor, a total checking length of the first checking mode is longer than that of the second checking mode.

Alternatively, for the same running process of the checked processor, the total checking length of the first checking mode being longer than the total checking length of the second checking mode comprises: for the same running process of the checked processor, the length of at least one check of the first checking mode being longer than that of the second checking mode; and/or for the same running process of the checked processor, the number of checks of the first checking mode being longer than that of the second checking mode.

Alternatively, when the security-sensitive condition includes the security-sensitive instruction, said determining whether a checked processor satisfies a security-sensitive condition comprises determining whether a frequency of the security-sensitive instruction executed by the checked processor so far is equal to or longer than a preset threshold.

Alternatively, when the security-sensitive condition includes the security-sensitive input/output operation, said determining whether a checked processor satisfies a security-sensitive condition comprises determining whether a frequency of the security-sensitive input/output operation executed by the checked processor so far is equal to or longer than a preset threshold.

Alternatively, when the security-sensitive condition includes processor running mode, said determining whether a checked processor satisfies a security-sensitive condition comprises determining whether the checked processor is currently running in the processor running mode.

Alternatively, when the security-sensitive condition includes the security-sensitive application, said determining whether a checked processor satisfies a security-sensitive condition comprises determining whether the security-sensitive application is currently running on the checked processor.

Alternatively, when the security-sensitive condition includes user-defined security level, said determining whether a checked processor satisfies a security-sensitive condition comprises determining whether the current security level of the checked processor belongs to the user-defined security level.

Alternatively, when the checked processor satisfies the security-sensitive condition, checking the checked processor according to the first checking mode comprises: when the checked processor satisfies the security-sensitive condition, prolonging checking length of the current check; and/or when the checked processor satisfies the security-sensitive condition, increasing the number of checks of the checked processor during the same running process of the checked processor.

Alternatively, before said determining whether the checked processor satisfies security-sensitive condition, the method further comprises: acquiring instruction stream output by the checked processor. Said determining whether the checked processor satisfies security-sensitive condition comprises: determining whether the checked processor satisfies security-sensitive condition according to the distribution characteristic of the security-sensitive instruction in the instruction stream.

Alternatively, the method further comprises: generating an interference signal in the checked processor when the checked processor is not being checked, so that a Trojan perceptible state in the checked processor not being checked is consistent with a Trojan perceptible state in the checked processor being checked.

Alternatively, when the checked processor is not being checked, generating an interference signal in the checked processor comprises: when the checked processor is not being checked, performing the same action on the checked processor as that performed when the checked processor is being checked by the checking device.

Alternatively, when the checked processor is not being checked, generating an interference signal in the checked processor comprises: when the checked processor is not being checked, according to signal type perceptible by the Trojan, generating a signal of the signal type generated when the checked processor is checked by the checking device.

Alternatively, after said checking the checked processor according to the determination result, the method further comprises: adjusting the security-sensitive condition according to the checking result when the checking result is unsafe.

Another aspect of the present disclosure provides a checking device for a processor comprising a determining unit and a checking unit. The determining unit is configured to determine whether a checked processor satisfies a security-sensitive condition including one or more of security-sensitive instruction, processor running mode, security-sensitive input/output operation, security-sensitive application, and user-defined security level. The checking unit is configured to detect the checked processor according to the determination result, which further comprises: when the checked processor satisfies the security-sensitive condition, checking the checked processor according to a first checking mode; and when the checked processor does not satisfy the security-sensitive condition, checking the checked processor according to a second checking mode. For the same running process of the checked processor, the total checking length of the first checking mode is longer than the total checking length of the second checking mode.

Alternatively, for the same running process of the checked processor, the total checking length of the first checking mode being longer than the total checking length of the second checking mode comprises: for the same running process of the checked processor, the length of at least one check of the first checking mode being longer than that of the second checking mode; and/or for the same running process of the checked processor, the number of checks of the first checking mode being longer than that of the second checking mode.

Alternatively, the determining unit comprises an instruction determining sub-unit configured to determine whether a frequency of the security-sensitive instruction executed by the checked processor so far is equal to or longer than a preset threshold.

Alternatively, the determining unit comprises an input/output operation determining sub-unit configured to determine whether a frequency of the security-sensitive input/output operation executed by the checked processor so far is equal to or longer than a preset threshold.

Alternatively, the determining unit comprises a processor running mode determining sub-unit configured to determine whether the checked processor is currently running in the processor running mode.

Alternatively, the determining unit comprises an application determining sub-unit configured to determine whether the security-sensitive application is currently running on the checked processor.

Alternatively, the determining unit comprises a security level determining sub-unit configured to determine whether the current security level of the checked processor belongs to the user-defined security level.

Alternatively, when the checked processor satisfies the security-sensitive condition, checking the checked processor according to the first checking mode comprises: when the checked processor satisfies the security-sensitive condition, prolonging checking length of the current check. Alternatively, when the checked processor satisfies the security-sensitive condition, checking the checked processor according to the first checking mode comprises: when the checked processor satisfies the security-sensitive condition, increasing the number of checks of the checked processor during the same running process of the checked processor.

Alternatively, the checking device further comprises an instruction stream acquiring unit configured to acquire instruction stream output by the checked processor. The determining unit determining whether the checked processor satisfies security-sensitive condition comprises: determining whether the checked processor satisfies security-sensitive condition according to the distribution characteristic of the security-sensitive instruction in the instruction stream.

Alternatively, the checking device further comprises a Trojan guard unit configured to generate an interference signal in the checked processor when the checked processor is not being checked, so that a Trojan perceptible state in the checked processor not being checked is consistent with a Trojan perceptible state in the checked processor being checked.

Alternatively, when the checked processor is not being checked, generating an interference signal in the checked processor comprises: when the checked processor is not being checked, performing the same action on the checked processor as that performed when the checked processor is being checked by the checking device.

Alternatively, when the checked processor is not being checked, generating an interference signal in the checked processor comprises: when the checked processor is not being checked, according to signal type perceptible by the Trojan, generating a signal of the signal type generated when the checked processor is checked by the checking device.

Alternatively, the checking device further comprises a security-sensitive condition adjusting unit configured to adjust the security-sensitive condition according to the checking result when the checking result is unsafe.

Another aspect of the present disclosure provides a checking system for a processor for checking a checked processor, comprising: one or more processors; and memory configured to store one or more programs, wherein the one or more programs, when executed by the one or more processors, cause the one or more processors to perform the method as mentioned above as mentioned above.

Alternatively, the checking system further comprises an input/output recorder configured to record input and output information of the checked processor during running process.

Another aspect of the present disclosure provides a computer-readable storage medium storing instructions capable of executing the method as mentioned above.

BRIEF DESCRIPTION OF THE DRAWINGS

For a more complete understanding of the present disclosure and its advantages, reference is now made to the following descriptions in connection with the accompanying drawings, in which:

FIG. 7 schematically shows a flow chart of a checking method for a processor according to another embodiment of the present disclosure;

FIGS. 8a to 8c schematically shows an application scenario of checking a checked processor according to a first checking mode according to an embodiment of the present disclosure;

DETAILED DESCRIPTION

Figure 1:
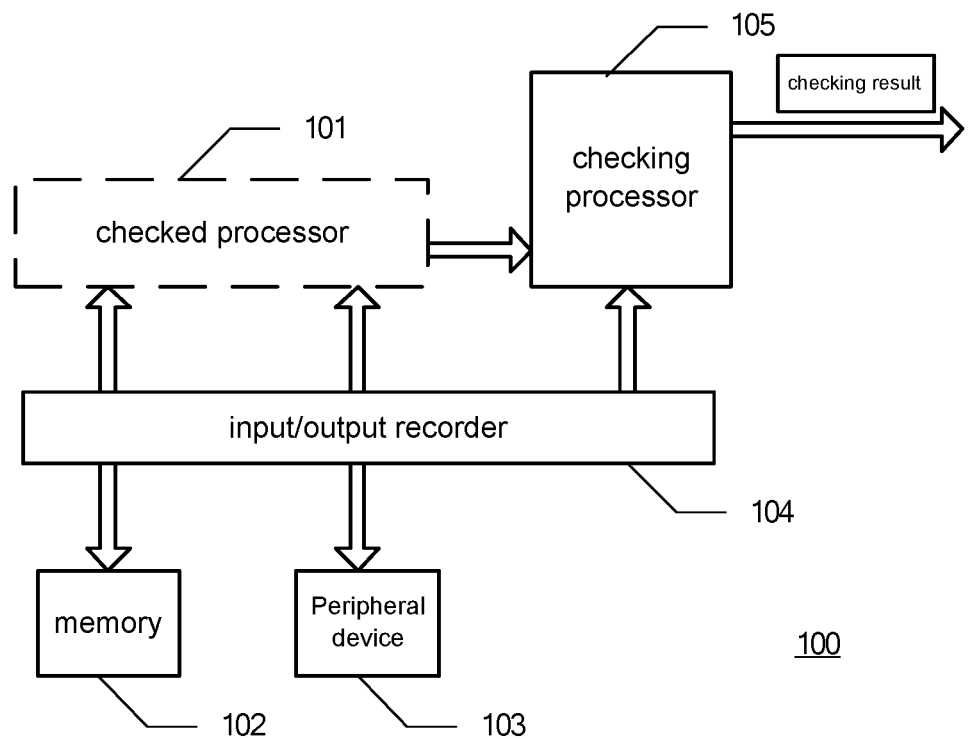
FIG. 1 schematically shows an exemplary system architecture of a processor checking method, a processor checking device and a checking system for a processor according to an embodiment of the present disclosure.

Hereinafter, embodiments of the present disclosure will be described with reference to the accompanying drawings. It should be understood, however, that these descriptions are merely exemplary and are not intended to limit the scope of the present disclosure. In addition, in the following description, descriptions of well-known structures and techniques are omitted to avoid unnecessarily obscuring the concepts of the present disclosure. In addition, the embodiments of the present disclosure provided below and the technical features in the embodiments may be combined with each other in any way.

The terminology used herein is for the purpose of describing particular embodiments only and is not intended to limit the present disclosure. Furthermore, the terms "include", "comprise", etc. as used herein indicate the presence of stated features, steps, operations, and/or components but do not preclude the presence or addition of one or more other features, steps, operations, or components.

All terms (including technical and scientific terms) used herein have the meaning as commonly understood by one of ordinary skill in the art, unless otherwise defined. It should be noted that terms used herein should be interpreted as having a meaning that is consistent with the context of the present description and should not be interpreted in an idealized or overly stereotypical manner.

Several block diagrams and/or flow charts are shown in the drawings. It should be understood that some of the blocks or combinations thereof in the block diagrams and/or flow charts may be implemented by computer program instructions. Such computer program instructions may be provided to a processor of a general purpose computer, a special purpose computer, or other programmable data processing apparatus such that the instructions, when executed by the processor, create means for implementing the functions/operations illustrated in these block diagrams and/or flow charts.

Accordingly, the techniques of the present disclosure may be implemented in the form of hardware and/or software (including firmware, microcode, etc.). Additionally, the techniques of the present disclosure may take the form of a computer program product on a computer readable medium having stored thereon instructions for use by or in connection with an instruction execution system. In the context of the present disclosure, a computer readable medium may be any medium that may contain, store, communicate, propagate, or transport the instructions. For example, computer readable medium may include but are not limited to electrical, magnetic, optical, electromagnetic, infrared, or semiconductor systems, apparatus, devices, or propagation medium. Specific examples of computer readable medium include a magnetic storage device such as a magnetic tape or a hard disk (HDD), an optical storage device such as a compact disc (CD-ROM), a memory such as a random access memory (RAM) or a flash memory, and/or wired/wireless communication link.

An embodiment of the present disclosure provides a checking method, checking device and checking system for a processor. The checking method comprises determining whether a checked processor satisfies security-sensitive condition, and checking the checked processor according to the determination result. The security-sensitive condition includes one or more of security-sensitive instruction, processor running mode, security-sensitive input/output operation, security-sensitive application, and user-defined security level. Checking the checked processor according to the determination result further comprises: when the checked processor satisfies the security-sensitive condition, checking the checked processor according to a first checking mode; and when the checked processor does not satisfy the security-sensitive condition, checking the checked processor according to a second checking mode. For the same running process of the checked processor, the total checking length of the first checking mode is longer than the total checking length of the second checking mode.

It should be understood that the checking length may be indicated by a number of instructions. In this case, the total number of instructions checked when the checked processor is checked by using the first checking mode is much more as compared with that of the second checking mode. It should be understood by those skilled in the art that, even though the same instruction is executed the same number of times, the required time may be different due to the difference in processor running efficiency. And when the processors are running at the same efficiency, the amount of time required to execute the same number of the same instructions is roughly the same. It should also be understood that the checking length may also be indicated by the length of time. This is not limited in the embodiments of the present disclosure. It should also be understood that the length of the same running process should be at least longer than the length at which the checked processor 101 is checked at least once in the second checking mode.

According to various embodiments of the present disclosure, when checking the security of the checked processor, the checking mode of checking the checked processor may be determined according to whether the checked processor satisfies the security sensitive condition. In this way, for the same running process of the checked processor, the checking length when the security sensitive condition is satisfied is longer than the checking length when the security sensitive condition is not satisfied. In this manner, when checking the checked processor, it is not necessary to completely detect the entire running process of the checked processor from power-on to power-off. On the one hand, it saves the resource consumption of the checking process and on the other hand makes the checking process more targeted, which makes the processing of the checking results more efficient.

FIG. 1 schematically shows an exemplary system architecture 100 of a checking method, a checking device and a checking system for a processor according to an embodiment of the present disclosure.

As shown in FIG. 1, the exemplary system architecture 100 includes a checked processor 101, a memory 102, a peripheral device 103, an input/output recorder 104, and a checking processor 105.

The checked processor 101 inter-exchanges with the memory 102 and/or the peripheral device 103 during the target running process.

The input/output recorder 104 records the input information and output information between the checked processor 101 and the memory 102 and/or the peripheral device 103 during the target running process.

When the checking processor 105 detects the checked processor 101, it uses the input information of the checked processor 101 during the target running process as input information, and sets the initial running status of the checking processor 104 according to the initial running status information of the checked processor 101 during the target running process. Then, the checking processor 105 performs the task of the target running process in a manner consistent with a predefined behavior to obtain the output information of the checking processor 101 during the target running process and/or the termination running status information of the target running process. The above mentioned predefined behavior is the processor's hardware behavior standards.

Various design considerations for determining security of a processor are further described in a U.S. application Ser. No. 15/804,188, filed on Nov. 6, 2017 and entitled "METHOD, CHECKING DEVICE, AND SYSTEM FOR DETERMINING SECURITY OF A PROCESSOR", which is incorporated herein by reference in their entirety as part of disclosure of the present application.

The target running process may be a stage in the whole running process of the checked processor 101 from power-on to power-off. For example, the entire running process of the checked processor 101 may be divided into a plurality of sub-running processes corresponding to a plurality of running intervals, and the selected sub-running process for performing security checking is referred to as a target running process. In this way, when performing security checking on the checked processor, certain sub-running processes are selected as the target running interval for checking correspondingly according to the first checking mode or the second checking mode according to whether the checked processor 101 satisfies the security-sensitive condition or not.

For example, according to the performance of the checking processor 104, when the checked processor 101 is running, it may be predefined that one or more sub-running processes are selected from every other sub-running process or every few sub-running processes of the checked processor 101 under the second checking mode as the target running process for checking. Similarly, when the checked processor 101 satisfies the security-sensitive condition, corresponding target running processes are selected according to the first checking mode, where the number of the target running processes selected in the first checking mode is longer than that in the second checking mode. In this way, when the security-sensitive condition is satisfied, the length of each sub-running process is kept unchanged, but more sub-running processes are selected for checking. As another example, when the security-sensitive condition is satisfied, the selected target running processes are prolonged on the basis of the second checking mode until the security-sensitive condition is no longer satisfied. When the security-sensitive condition is no longer satisfied, the checking is resumed to the original length of the sub-running process.

For the entire running process of the checked processor 101 from power-on to power-off, the degree of threat to the checked processor 101 in different stages of running processes may be different. Therefore, depending on whether the checked processor 101 satisfies the security-sensitive condition, corresponding target running processes are selectively checked in a different manner, which helps to improve the checking efficiency.

When determining whether the checked processor 101 is safe during the target running process, the checking processor 105 may determine, based on the output information and/or the termination status information of the checking processor 105 after the checking processor 105 has completed the task in the target running process, whether the checked processor 101 is safe during the target running process. It should be understood that, it may also be determined, according to the output information that is output in real time and/or one or more intermediate states acquired in real time during the execution of the task, whether the checked processor 101 is safe during the target running process.

For example, a first comparison result is obtained by comparing the output information of the checking processor 105 with the output information of the checked processor 101 during the target running process, and/or a second comparison result is obtained by comparing the termination running status information of the checking processor 105 with the termination running status information of the checked processor 101 upon the execution of the target running process, and determine whether the checked processor 101 is safe during the target running process according to the first comparison result and/or the second comparison result.

For example, when the first comparison result indicates that the output information of the checking processor 105 is not consistent with the output information of the checked processor 101 during the target running process, or the second comparison result indicates that the termination running status information of the checking processor 105 is not consistent with the termination running status information of the checked processor 101 upon the execution of the target running process, it is determined that the checked processor 101 is unsafe during the target running process.

Alternatively, when the first comparison result indicates that the output information of the checking processor 105 is consistent with the output information of the checked processor 101 during the target running process, and the second comparison result indicates that the termination running status information of the checking processor 105 is consistent with the termination running status information of the checked processor 101 upon the execution of the target running process, it is determined that the checked processor 101 is safe during the target running process.

Figure 2:
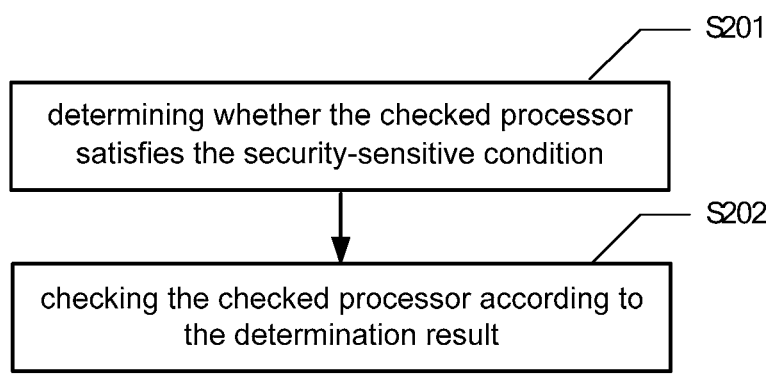
FIG. 2 schematically shows a flow chart of a checking method for a processor according to an embodiment of the present disclosure.

FIG. 2 schematically shows a flow chart of a checking method for a processor according to an embodiment of the present disclosure. This checking method may be performed by the checking processor 105 in the checking device.

As shown in FIG. 2, the checking method includes operation S201 and operation S202.

In operation S201, it is determined whether the checked processor 101 satisfies the security-sensitive condition.

According to an embodiment of the present disclosure, the security sensitive condition is a preset condition that highly threatens the running security of the checked processor 101.

In particular, the security-sensitive condition includes one or more of security-sensitive instruction, processor running mode, security-sensitive input/output operation, security-sensitive application, and user-defined security level.

According to an embodiment of the present disclosure, the security-sensitive instruction may be some pre-selected instructions of higher security threat that may be executed by the checked processor 101, such as some complex functional instructions, and/or instructions corresponding to the case when it is determined to be unsafe during the security checking process. In an embodiment, the checking device may update the security-sensitive condition in real time according to the security checking result. For example, after the operation S202, when the checking result is unsafe, the security-sensitive condition is adjusted according to the checking result. If the instruction corresponding to the checking result does not belong to the security-sensitive instruction, the instruction corresponding to the checking result may be added to the security-sensitive condition so as to be a new security-sensitive instruction.

In general, various instructions executed by the checked processor 101 may be unevenly distributed, and may also present certain statistical characteristics. For example, an instruction having a higher frequency of occurrence in the instructions executed by the checked processor 101 may be a simple instruction such as read or write instruction of the memory 102, data move instruction, and/or jump instruction. However, some complex functional instructions, such as SIMD (Single Instruction Multiple Data) operation instruction or floating-point operation instruction, do not appear frequently. These complex functional instructions may contain higher security threats, because these complex instructions are usually implemented using microcode which can be updated through the microcode upgrade, resulting in poor security control, and the functional behavior of these instructions is complex. In this way, it may be determined in operation S201 whether there is a security-sensitive instruction among the instructions executed by the checked processor 101 or whether the frequency of the security-sensitive instruction executed reaches a predetermined threshold.

Similarly, the security-sensitive input/output operation may be a pre-selected input/output operation that is highly threatening to the checked processor 101 or an input/output operation that users are more concerned about. For example, when a network adapter is regarded as a relatively sensitive input/output device, the input/output operation of the network adapter by the checked processor 101 belongs to a security-sensitive input/output operation. In this way, it may be determined in operation S201 whether there is a security-sensitive input/output operation among the input/output operations executed by the checked processor 101 or whether the frequency of the security-sensitive input/output operation executed reaches a predetermined threshold.

The processor running mode may be, for example, the checked processor 101 running in kernel mode. A program in kernel mode in the checked processor 101 may have a higher authority and may interact more directly with the hardware, so as to be more likely to form a hardware-and-software integrated Trojan, or exploit the checked processor 101, and the like. Therefore, it may be determined in operation S201 whether the checked processor 101 is in a processor running mode, and then the checking mode to be applied is determined accordingly.

User-defined security level may be, for example, the corresponding security level set to the processor by the user based on experience. User-defined security level can be only one security level, or can be more than one security level. In this way, it may be determined in operation S201 whether the checked processor 101 currently belongs to the user-defined security level.

Similarly, the security-sensitive application may be, for example, an application predefined by a user according to experience, or an application that is predefined by the user and requires high security. When a specific application is running, the instruction flow executed by the processor presents certain characteristics, for example, a specific instruction combination appears in the instruction stream executed. Therefore, when determining whether a security-sensitive application is running on the processor, the checking device can determine whether a predefined instruction combination appears in the instruction flow executed by the checked processor and then determine whether a corresponding security-sensitive application is currently running. Alternatively, the checking device can monitor the types of applications launched in the operating system when determining whether a security-sensitive application is running on the processor. When it is monitored that the operating system activates the security-sensitive application (that is, the foregoing security-sensitive condition is satisfied), an instruction is sent to the checking device to instruct the checking device to switch to the first checking mode.

In operation S202, the checked processor 101 is checked according to the determination result.

Specifically, checking the checked processor according to the determination result may comprise: when the checked processor 101 satisfies the security-sensitive condition, checking the checked processor 101 according to a first checking mode; and when the checked processor 101 does not satisfy the security-sensitive condition, checking the checked processor 101 according to a second checking mode. For the same running process of the checked processor, the total checking length of the first checking mode is longer than the total checking length of the second checking mode.

According to an embodiment of the present disclosure, for the same running process of the checked processor, the total checking length of the first checking mode is longer than the total checking length of the second checking mode. This may mean that during the checking of the same running process, the checking is performed at least once in the first checking mode, thus the actual total checking length is longer than the total checking length assuming only the second checking mode is applied in the same running process.

In the checking method according to the embodiment of the present disclosure, checking is performed in different checking manners according to whether the checked processor 101 satisfies the security-sensitive condition or not, so that an running situation with a high threat to the checked processor 101 is checked more focusedly, making the checking process more targeted, and the checking results more efficient.

Further, the checking method according to the embodiment of the present disclosure can avoid wasting resources when the entire running process of the checked processor 101 is checked completely, and can also avoid the problems that the running situations with a high threat to the checked processor 101 are missed when the entire running process of the checked processor 101 is checked at random intervals without judgment.

Figure 3:
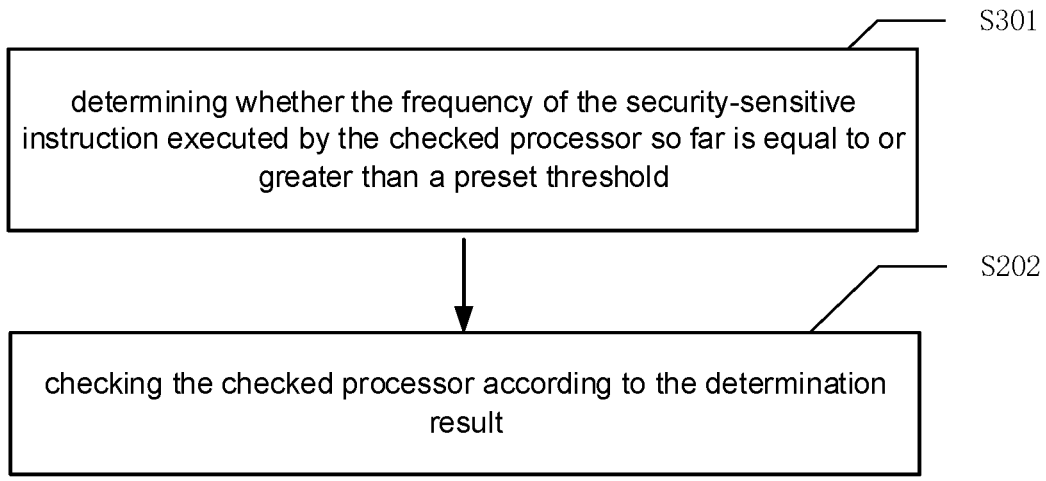
FIG. 3 schematically shows a flow chart of a checking method for a processor according to another embodiment of the present disclosure.

FIG. 3 schematically shows a flow chart of a checking method for a processor according to another embodiment of the present disclosure. This checking method may be performed by the checking processor 105 in the checking device.

As shown in FIG. 3, the checking method includes operation S301 and operation S302 where operation S301 is one of specific embodiments of operation S201.

When the security-sensitive condition includes the security-sensitive instruction, in operation S301, it is determined whether the frequency of the security-sensitive instruction executed by the checked processor 101 so far is equal to or longer than a preset threshold. Then, in operation S202, the checked processor 101 is checked according to the determination result.

Specifically, when the frequency of the security-sensitive instruction executed by the checked processor 101 is equal to or longer than a preset threshold, the checked processor is checked according to the first checking mode. When the frequency of the security-sensitive instruction executed by the checked processor 101 is less than a preset threshold, the checked processor is checked according to the second checking mode. For the same running process of the checked processor, the total checking length of the first checking mode is longer than the total checking length of the second checking mode.

According to an embodiment of the present disclosure, the preset threshold may be any positive number. For example, the frequency of the security-sensitive instruction may be expressed as the number of occurrences of the instruction so far or as the number of occurrences of the instruction per unit time so far.

It is assumed that the frequency of security-sensitive instruction is represented by the number of occurrences. When the preset threshold is 1, that is, once the security sensitive instruction appears in the instructions executed by the checked processor 101 so far, the checked processor 101 may be checked according to the first checking mode. Or when the preset threshold is other preset values longer than 1, that is, when the frequency of the security-sensitive instruction executed by the checked processor 101 is equal to or longer than the preset value so far, the checked processor 101 may be checked according to the first checking mode.

In this way, when the frequency of the security-sensitive instruction executed by the checked processor 101 is equal to or longer than a preset threshold so far, the checked processor 101 is checked in the first checking mode to increase the checking length of this stage of running process, so as to increase the checking coverage of the security-sensitive instruction executed by the checked processor 101, which can detect more specifically and more focusedly whether there are security issues when the checked processor 101 executes the security-sensitive instruction.

Moreover, when the frequency of the security-sensitive instruction executed by the checked processor 101 is less than a preset threshold, the checked processor 101 is checked in a second checking mode to reduce the checking length of this stage of running process, which can reduce the cost of the checking process and improve running efficiency.

Figure 4:
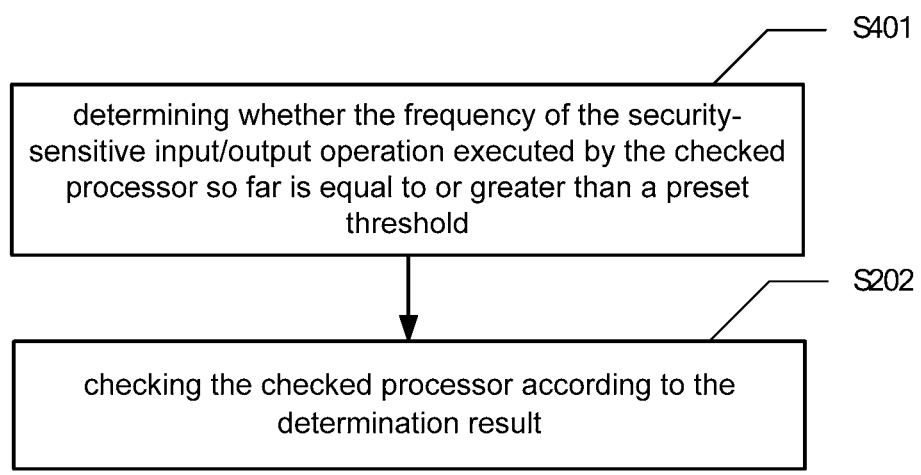
FIG. 4 schematically shows a flow chart of a checking method for a processor according to another embodiment of the present disclosure.

FIG. 4 schematically shows a flow chart of a checking method for a processor according to another embodiment of the present disclosure. This checking method may be performed by the checking processor 105 in the checking device.

As shown in FIG. 4, the checking method includes operation S401 and operation S202 where operation S401 is one of specific embodiments of operation S201.

When the security-sensitive condition includes the security-sensitive input/output operation, in operation S401, it is determined whether the frequency of the security-sensitive input/output operation executed by the checked processor 101 so far is equal to or longer than a preset threshold. Then, in operation S202, the checked processor 101 is checked according to the determination result.

Specifically, when the frequency of the security-sensitive input/output operation executed by the checked processor 101 is equal to or longer than a preset threshold, the checked processor 101 is checked according to the first checking mode. When the frequency of the security-sensitive input/output operation executed by the checked processor 101 is less than a preset threshold, the checked processor 101 is checked according to the second checking mode. For the same running process of the checked processor, the total checking length of the first checking mode is longer than the total checking length of the second checking mode.

According to an embodiment of the present disclosure, the preset threshold may be any positive number. For example, the frequency of the security-sensitive input/output operation may be expressed as the number of occurrences of the operation so far or as the number of occurrences of the operation per unit time so far.

It is assumed that the frequency of security-sensitive input/output operation is represented by the number of occurrences. When the preset threshold is 1, that is, once the security sensitive input/output operation appears in the input/output operations executed by the checked processor 101 so far, the checked processor 101 may be checked according to the first checking mode. Or when the preset threshold is other preset values longer than 1, that is, when the frequency of the security-sensitive input/output operation executed by the checked processor 101 is equal to or longer than the preset value so far, the checked processor 101 may be checked according to the first checking mode.

In this way, when the frequency of the security-sensitive input/output operation executed by the checked processor 101 is equal to or longer than a preset threshold so far, the checked processor 101 is checked in the first checking mode to increase the checking length of this stage of running process, so as to increase the checking coverage of the security-sensitive input/output operation executed by the checked processor 101, which can detect more specifically and more focusedly whether there are security issues when the checked processor 101 executes the security-sensitive input/output operation.

Moreover, when the frequency of the security-sensitive input/output operation executed by the checked processor 101 is less than a preset threshold, the checked processor 101 is checked in a second checking mode to reduce the checking length of this stage of running process, which can reduce the cost of the checking process and improve running efficiency.

Figure 5:
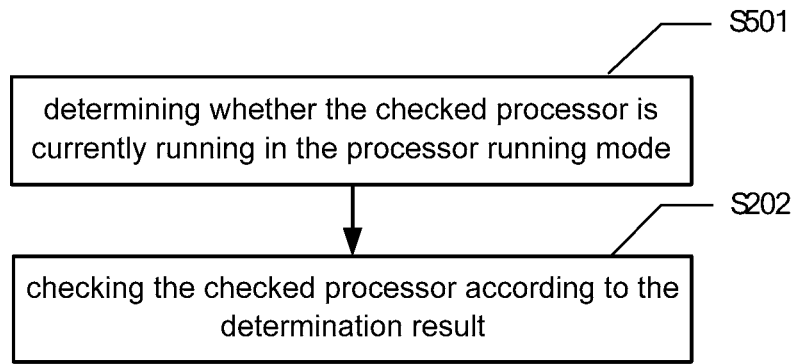
FIG. 5 schematically shows a flow chart of a checking method for a processor according to another embodiment of the present disclosure.

FIG. 5 schematically shows a flow chart of a checking method for a processor according to another embodiment of the present disclosure. This checking method may be performed by the checking processor 105 in the checking device.

As shown in FIG. 5, the checking method includes operation S501 and operation S202. Operation S501 is one of specific embodiments of operation S201.

When the security-sensitive condition includes the processor running mode, it is determined in operation S501 whether the checked processor 101 is currently running in the processor running mode. Then, in operation S202, the checked processor 101 is checked according to the determination result.

Specifically, when the checked processor 101 is currently running in the processor running mode, the checked processor 101 is checked according to the first checking mode. When the checked processor 101 is not currently running in the processor running mode, the checked processor 101 is checked according to the second checking mode. For the same running process of the checked processor, the total checking length of the first checking mode is longer than the total checking length of the second checking mode.

In this way, when the checked processor 101 is currently running in the processor running mode, the checked processor 101 is checked more focusedly with the first checking mode, making the checking more targeted and efficient.

Figure 6:
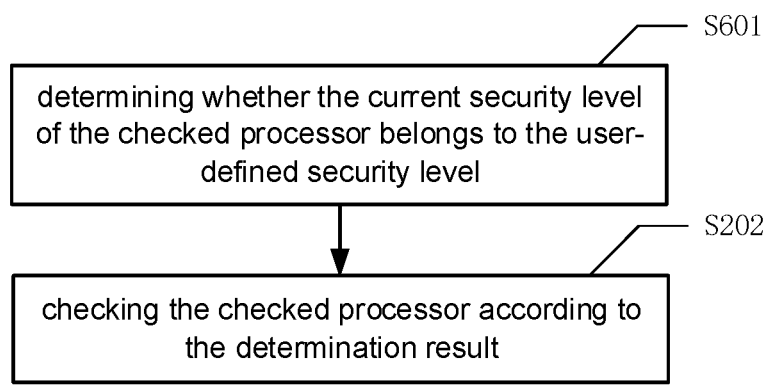
FIG. 6 schematically shows a flow chart of a checking method for a processor according to another embodiment of the present disclosure.

FIG. 6 schematically shows a flow chart of a checking method for a processor according to another embodiment of the present disclosure. This checking method may be performed by the checking processor 105 in the checking device.

As shown in FIG. 6, the checking method includes operation S601 and operation S202. Operation S601 is one of specific embodiments of operation S201.

When the security sensitive condition includes user-defined security level, it is determined in operation S601 whether the current security level of the checked processor 101 belongs to the user-defined security level. Then, in operation S202, the checked processor 101 is checked according to the determination result.

Specifically, when the current security level of the checked processor 101 belongs to the user-defined security level, the checked processor 101 is checked according to the first checking mode. When the current security level of the checked processor 101 does not belong to the user-defined security level, the checked processor 101 is checked according to the second checking mode. For the same running process of the checked processor, the total checking length of the first checking mode is longer than the total checking length of the second checking mode.

In this way, when the checked processor 101 runs at the user-defined security level, the checking time may be increased by the first checking mode to perform the checking more focusedly. Moreover, the user-defined security level can be more than one, for example, for the same running process of the checked processor, the total checking length of the first checking mode may be longer as the security level is higher, so that a stepped checking may be implemented for different security levels of running of the checked processor 101. In this way, on the one hand, the checking resources are saved and, on the other hand, the checking efficiency is increased.

FIG. 7 schematically shows a flow chart of a checking method for a processor according to another embodiment of the present disclosure. This checking method may be performed by the checking processor 105 in the checking device.

As shown in FIG. 7, the checking method includes operation S701, S702 and S202 where operation S702 is one of specific embodiments of operation S201.

First, the instruction stream output by the checked processor 101 is acquired in operation S701.

Then, in operation S702, it is determined whether the checked processor 101 satisfies the security-sensitive condition according to the distribution characteristic of the security-sensitive instruction in the instruction stream.

For example, the checked processor 101 outputs the corresponding instruction every time an operation is performed. In this case, acquiring the instruction stream output by the checked processor 101 allows analyzing the distribution characteristics of the security-sensitive instruction in the instruction stream before the task of the target running process is executed by the checking processor 105.

Next, in operation S202, the checked processor 101 is checked according to the determination result.

That is, according to the distribution characteristic of the security-sensitive instruction in the instruction stream output by the checked processor 101, the checked processor 101 is checked according to the first checking mode when the checked processor 101 satisfies the security-sensitive condition, while the checked processor 101 is checked according to the second checking mode when the checked processor 101 does not satisfy the security-sensitive condition. For the same running process of the checked processor, the total checking length of the first checking mode is longer than the total checking length of the second checking mode.

In this way, the checking mode of the checked processor 101 is selected according to the distribution characteristics of the instruction stream, and the running stage of the checked processor 101 satisfying the security-sensitive condition can be reproduced as the target running process so as to be checked, making the checking more targeted and improving the checking efficiency. It should be noted that in this case, the checking processor 105 usually lags behind the checked processor 101 to reserve the processing time for obtaining and analyzing the distribution characteristic of the security-sensitive instruction and the like in the instruction stream.

According to an embodiment of the present disclosure, in operation S202, for the same running process of the checked processor, the total checking length of the first checking mode is longer than the total checking length of the second checking mode. In particular, for the same running process, the length of at least one check of the first checking mode is longer than that of the second checking mode; and/or for the same running process, the number of checks of the first checking mode is longer than that of the second checking mode.

For example, it is assumed that the checking length is indicated by the length of time. Assume that the same running process is a custom length of time, for example, 4 ms. For example, the total checking duration of the second checking mode is preset to 1 ms within 4 ms, then the total checking duration of the first checking mode may be preset to any value of more than 1 ms and less than or equal to 4 ms, for example, 3 ms.

In addition, the total checking duration of 1 ms of the second checking mode within 4 ms may be preset as one check, or may be preset as the total duration of multiple checks. Correspondingly, the total checking duration 3 ms of the first checking mode may be preset as one check, or may be preset as the total duration of multiple checks.

For example, when the number of checks performed in the second checking mode and the number of checks performed in the first checking mode are the same within 4 ms, it is natural that the duration of at least one check in the first checking mode longer than the duration of at least one check in the second checking mode, so that the total checking duration of the first checking mode reaches 3 ms, and the total checking duration of the second checking mode reaches 1 ms.

Or within 4 ms, for example, if the length of time of each check performed in the second checking mode is the same as that in the first checking mode, then the number of checks performed in the first checking mode is naturally longer than the number of checks performed in the second checking mode, so that the total checking duration of the first checking mode reaches 3 ms, and the total checking duration of the second checking mode reaches 1 ms.

Alternatively, for example, the duration of at least one check performed in the first checking mode may be longer than the duration of at least one check performed in the second checking mode, and meanwhile the number of checks performed in the first checking mode may be longer than the number of checks performed in the second checking mode, so that within 4 ms, the total checking duration of the first checking mode reaches 3 ms, and the total checking duration of the second checking mode reaches 1 ms. For example, within 4 ms, two checks can be performed in the second checking mode, and the duration of each check can be 0.5 ms. Within the same 4 ms, three checks can be performed in the first checking mode, and the duration of each check can be 0.5 ms, 1 ms, and 1.5 ms, respectively.

According to the embodiment of the present disclosure, the user may freely determine the specific checking pattern of the first checking mode and the specific checking pattern of the second mode as needed, as long as for the same running process of the checked processor, the total checking length of the first checking mode is longer than the total checking length of the second checking mode, so as to realize targeted checking of the running stage with a high threat to the running security of the checked processor 101.

According to an embodiment of the present disclosure, when the checked processor 101 is checked according to the determination result in operation S202, when the checked processor 101 satisfies the security-sensitive condition, the checked processor 101 is checked according to the first checking mode, in particular, when the checked processor 101 satisfies the security-sensitive condition, the checking length of the current check may be prolonged. Additionally or alternatively, when the checked processor 101 satisfies the security-sensitive condition, the number of checks of the checked processor 101 is increased during the same running process of the checked processor. Reference may be made to the exemplary description in FIGS. 8a to 8c.

FIGS. 8a to 8c schematically shows an application scenario of checking a checked processor 101 according to a first checking mode according to an embodiment of the present disclosure.

In FIGS. 8a to 8c, description will be given taking an example in which a security-sensitive condition is a security-sensitive instruction.

It is assumed that the statistical result of the security-sensitive instruction executed by the checked processor 101 is shown in FIG. 8a. In this case, the occurrence frequency of security-sensitive instruction is found to increase (in other words, security-sensitive instruction starts to occur) at analysis point A, and the occurrence frequency of security-sensitive instruction is found to reduce at analysis point B (in other words, no security-sensitive instructions). According to an embodiment of the present disclosure, the checked processor 101 may be checked in the first checking code from point A, and the checked processor 101 may be checked in the second checking mode from point B. For example, in the second checking mode, the running interval is divided by a time length of 1 ms, and one running interval is selected as a target running process in every four running intervals to cause the checking processor 105 to run the target running process to detect the security of the checked device 101.

When the checked processor 101 satisfies the security-sensitive condition, the checked processor 101 is checked according to the first checking mode, in particular, the checking length of the current check may be prolonged when the checked processor 101 satisfies the security-sensitive condition, as shown in FIG. 8b. From point A, the current check interval is extended until real-time monitoring reveals that the occurrence frequency of the security-sensitive instruction falls below the threshold. When there is no security-sensitive instruction at point B, the current check in the first checking mode may be finished, so that the checked processor 101 may be checked in the second checking mode before the next discovery of the security-sensitive instruction. It should be noted that the running efficiency of the checking processor 105 is usually lower than that of the checked processor 101. Therefore, in order to record the running status of the checked processor 101 in a timely manner, the running status of the checked processor 101 may be periodically recorded at predetermined time intervals, instead of recording the running state of the checked processor 101 until a security-sensitive instruction is found, which prevents the checking from covering a longer range than the distribution range of security-sensitive instruction.

Alternatively, when the checked processor 101 satisfies the security-sensitive condition, the checked processor 101 is checked according to the first checking mode, in particular, the number of checks of the checked processor 101 during the same running process of the checked processor 101 may be increased, as shown in FIG. 8c. Increase the sampling rate without changing the length of the run interval. For example, at point A, more checking intervals are selected for security checking in the first checking mode, and when there is no sensitivity instruction at point B, only a small number of checking intervals are selected for security checking in the second checking mode. In this way, the checking device may detect the checked processor 101 in the second checking mode until the next discovery of the security-sensitive instruction.

Figure 9:
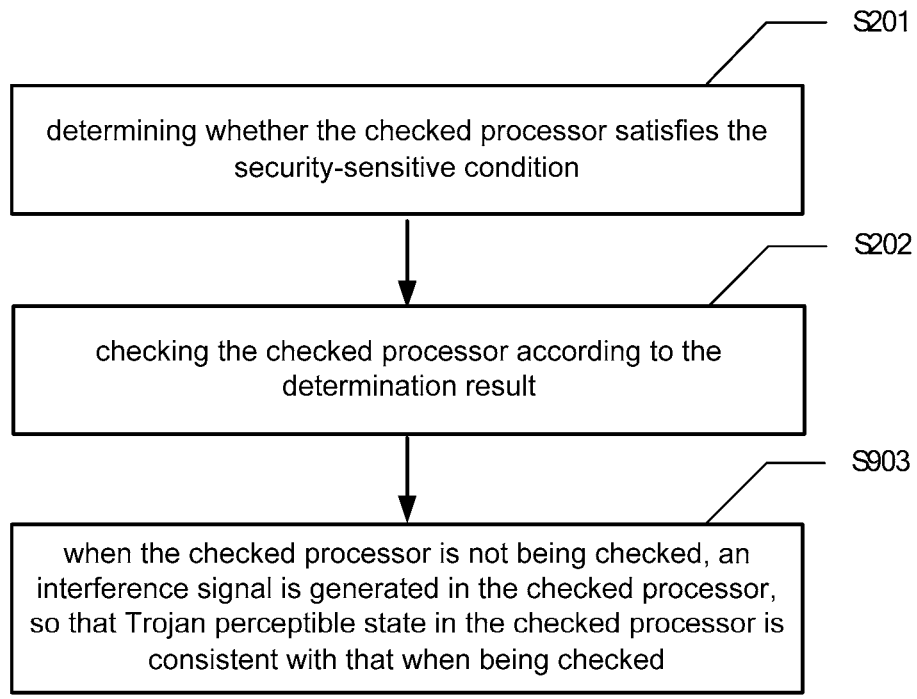
FIG. 9 schematically shows a flow chart of a checking method for a processor according to another embodiment of the present disclosure.

FIG. 9 schematically shows a flow chart of a checking method for a processor according to another embodiment of the present disclosure.

As shown in FIG. 9, the checking method further includes operation S903 after operation S201 and operation S202. This checking method may be performed by the checking processor 105 in the checking device.

In operation S903, when the checked processor 101 is not being checked, an interference signal is generated in the checked processor 101, so that a Trojan perceptible state in the checked processor 101 not being checked is consistent with a Trojan perceptible state in the checked processor being checked.

According to an embodiment of the present disclosure, when the checked processor 101 is not being checked, generating an interference signal in the checked processor 101 comprises: when the checked processor 101 is not being checked, performing the same action on the checked processor 101 as that performed when the checked processor 101 is being checked by the checking device.

Alternatively, when the checked processor 101 is not being checked, generating an interference signal in the checked processor 101 comprises: when the checked processor 101 is not being checked, according to signal type perceptible by the Trojan, generating a signal of the signal type generated when the checked processor 101 is checked by the checking device.

For example, recording the input and output of the checked processor 101 during the security checking will bring additional operation. This additional operation may be, for example, a suspend-record operation for aligning an asynchronous event to the instruction, at which point the checked processor 101 suspends execution of the instruction stream upon reception of a notification to execute an asynchronous event, and then aligns the asynchronous event to the instruction. If these additional operations are not performed on the checked processor 101 when no security checking is performed, then the hardware Trojan designer may make use of this difference to determine whether there is a checking behavior to prevent the Trojan from attacking during the presence of the checking behavior, thereby avoiding being checked by security checking.

For another example, when checking the checked processor 101, usually the duration of a single check is not particularly long due to the limited storage capacity of the data recording module. For example, the maximum checking time may be as long as 1 ms. It is also necessary to save the state of the checked processor 101 at the start point and the end point of a single check. Thus, if a sufficiently intelligent Trojan may sense the operation of saving state of the checked processor 101, and when the checked processor 101 has not saved state for 5 ms continuously, then the Trojan may determine that the checked processor 101 is not being checked, and that Trojans attack may not be found at this time.

As another example, assume that the checked processor 101 is integrated with the checking processor 105. The running of the checked processor 101 and the checking processor 105 is not necessarily synchronized in time, and the input/output recorder 104 may be relatively busy while the checking processor 105 may be in an idle state during the checking of the checked processor 101. However, when the checked processor 101 is not being checked, the input/output recorder 104 is not working, while the checking processor 105 may be busy calculating the security of the checked processor 101 in the previous checking stage. The different working hours of different modules will result in different power consumption of the entire chip. If these power consumption data may be perceived by the Trojan (for example, the voltage on the core is typically reduced when the chip power is high), the Trojan may choose to avoid periods during which the checking behavior exists. In this case, we may run some simulation operations while checking the checked processor 101, run some recording actions when the checked processor 101 is not being checked, thus reducing the probability that the power consumption is sensed, so as to prevent the Trojan from perceiving the existence of the checking behavior.

According to the embodiment of the present disclosure, the determination of operation S201 is performed first in the checking of the checked processor 101, and then a part of the running stages are selectively checked according to the determination result in operation S202. However, when the checked processor 101 is not being checked, in order to prevent the Trojan from checking the existence of the checking behavior, an interference signal is generated in the checked processor 101 so that the state perceptible by the Trojan in the checked processor 101 is consistent with that being checked, so that the Trojan may not perceive the real checking behavior, thereby enhancing the accuracy of the checking results.

Figure 10:
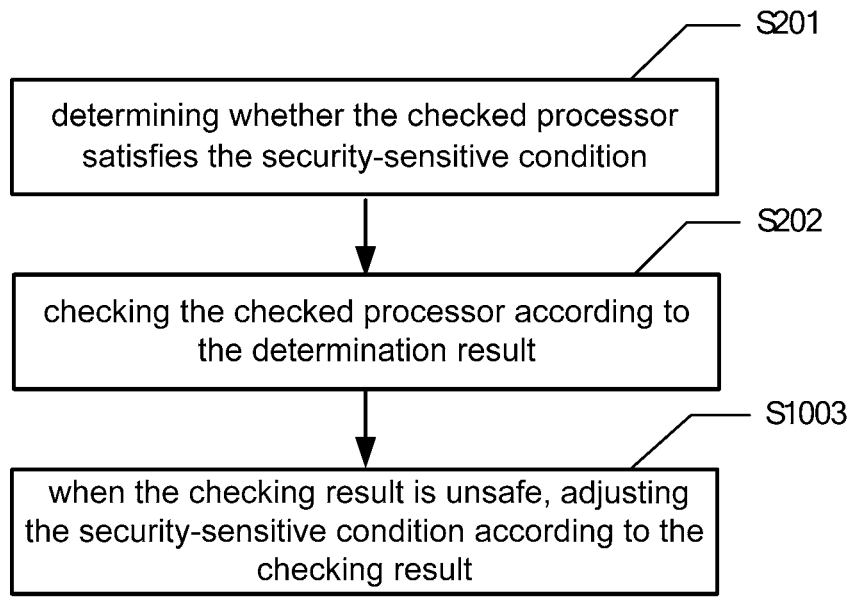
FIG. 10 schematically shows a flow chart of a checking method for a processor according to another embodiment of the present disclosure.

FIG. 10 schematically shows a flow chart of a checking method for a processor according to another embodiment of the present disclosure.

As shown in FIG. 10, the checking method includes operation S1003 in addition to operation S201 and operation S202, where operation S1003 is located after operation S202.

In operation S1003, when the checking result is unsafe, the security-sensitive condition is adjusted according to the checking result.

In an embodiment of the present disclosure, the security-sensitive condition may be updated in real time according to the security checking result. For example, when the checking result is not safe, the security-sensitive condition is adjusted according to the checking result. For example, if a certain running stage of the checked processor 101 is checked and found to be unsafe, and the instruction corresponding to the checking result does not belong to the safety-sensitive instruction, then the instruction corresponding to the checking result may be added to the security-sensitive condition to make it a new security-sensitive instruction.

Alternatively, if the corresponding input/output operation is not a security-sensitive input/output operation when the checking result is unsafe, the input/output operation corresponding to the checking result may be added to the security-sensitive condition to make it a new security-sensitive input/output operation.

Similarly, the corresponding processor running mode or security level when the checking result is unsafe may also be adjusted according to the checking result.

According to the embodiment of the present disclosure, when the checking result is unsafe, the security-sensitive condition is adjusted according to the checking result, so that effective feedback is provided to the checking process based on the checking result, and the checking efficiency is improved.

Figure 11:
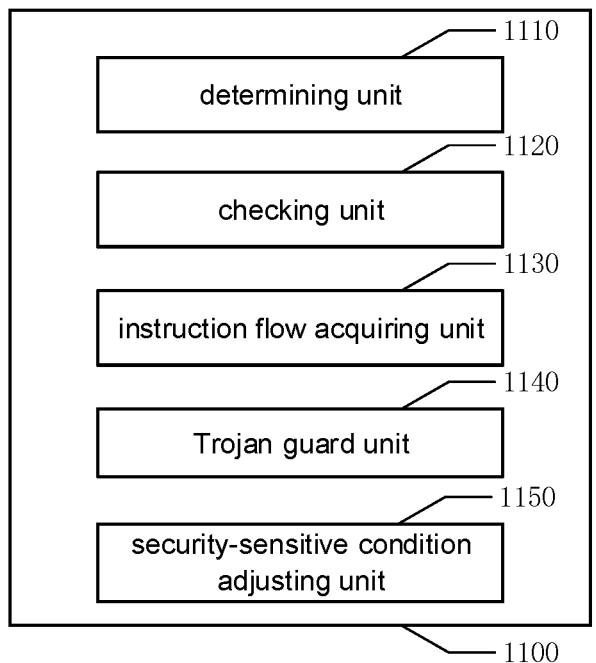
FIG. 11 schematically shows a block diagram of a checking device for a processor according to an embodiment of the present disclosure.

FIG. 11 schematically shows a block diagram of a checking device for a processor according to an embodiment of the present disclosure.

As shown in FIG. 11, the checking device 1100 includes a determining unit 1110 and a checking unit 1120.

The determining unit 1110 is configured to determine whether the checked processor 101 satisfies a security-sensitive condition including one or more of security-sensitive instruction, processor running mode, security-sensitive input/output operation, security-sensitive application, and user-defined security level.

The checking unit 1120 is configured to detect the checked processor 101 according to the determination result. Specifically, when the checked processor 101 satisfies the security-sensitive condition, the checked processor 101 is checked according to a first checking mode. When the checked processor 101 does not satisfy the security-sensitive condition, the checked processor 101 is checked according to a second checking mode. For the same running process of the checked processor, the total checking length of the first checking mode is longer than the total checking length of the second checking mode.

In the checking device 1100 according to the embodiment of the present disclosure, checking is performed in different checking manners according to whether the checked processor 101 satisfies the security-sensitive condition or not, so that an running situation with a high threat to the checked processor 101 is checked more focusedly, making the checking process more targeted, and the checking results more efficient.

Further, in the checking of the checked processor 101, the checking device 1100 according to the embodiment of the present disclosure may avoid wasting resources when the entire running process of the checked processor 101 is checked completely, and may also avoid the problems that the running situations with a high threat to the checked processor 101 are missed when the entire running process of the checked processor 101 is checked at random intervals without judgment.

According to an embodiment of the present disclosure, the checking device 1100 further includes an instruction flow acquiring unit 1130.

The instruction stream acquiring unit 1130 is configured to acquire the instruction stream output by the checked processor 101.

After the instruction stream acquiring unit 1130 acquires the instruction stream output by the checked processor 101, the determining unit 1110 may determine whether the checked processor 101 satisfies the security-sensitive condition according to the distribution characteristic of the security-sensitive instruction in the instruction stream.

Thus, the checking unit 1120 may detect the checked processor 101 according to the determination result.

In this way, the checking device 1100 may select the checking mode of the checked processor 101 according to the distribution characteristics of the instruction stream, and the running stage of the checked processor 101 satisfying the security-sensitive condition may be reproduced as the target running process so as to be checked, making the checking more targeted and improving the checking efficiency.

According to an embodiment of the present disclosure, the checking device 1100 further includes a Trojan guard unit 1140.

The Trojan guard unit is configured to generate an interference signal in the checked processor 101 when the checked processor 101 is not being checked, so that a Trojan perceptible state in the checked processor 101 not being checked is consistent with a Trojan perceptible state in the checked processor being checked.

Specifically, the Trojan guard unit 1140 is configured to perform the same action on the checked processor 101 as that performed when the checked processor 101 is being checked by the checking device when the checked processor 101 is not being checked.

Alternatively, the Trojan guard unit 1140 is configured to generate a signal of the signal type generated when the checked processor 101 is checked by the checking device according to the signal type perceptible by the Trojan when the checked processor 101 is not being checked.

According to the checking device 1100 of the embodiment of the present disclosure, when the checked processor 101 is not being checked, in order to prevent the Trojan from checking the existence of the checking behavior, an interference signal is generated in the checked processor 101 so that the state perceptible by the Trojan in the checked processor 101 is consistent with that being checked, so that the Trojan may not perceive the real checking behavior, thereby enhancing the accuracy of the checking results.

According to an embodiment of the present disclosure, the checking device 1100 also includes a security-sensitive condition adjusting unit 1150 configured to adjust the security-sensitive condition according to the checking result when the checking result is unsafe. Thus, effective feedback is provided to the checking process based on the checking result, and the checking efficiency is improved.

Figure 12:
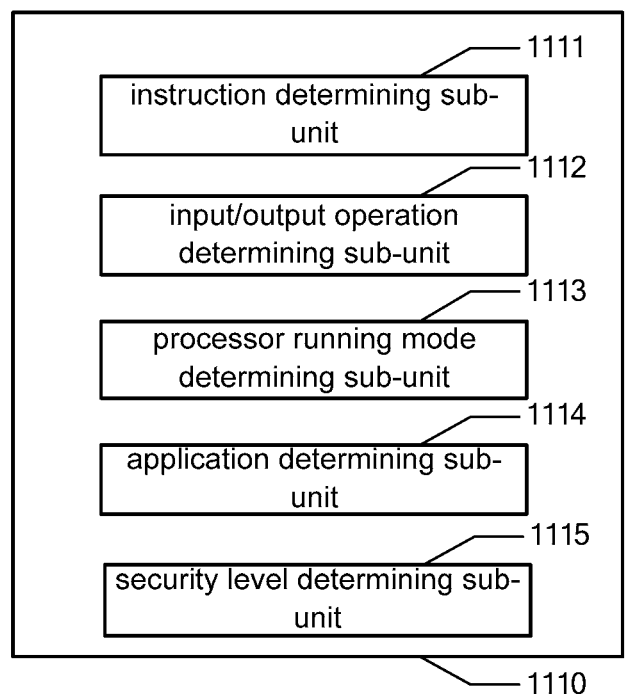
FIG. 12 schematically shows a block diagram of a determination unit of a checking device for a processor according to an embodiment of the present disclosure.

FIG. 12 schematically shows a block diagram of a determination unit of a checking device for a processor 1100 according to an embodiment of the present disclosure.

As shown in FIG. 11, the determining unit 1110 includes any one or more of an instruction determining sub-unit 1111, an input/output operation determining sub-unit 1112, a processor running mode determining sub-unit 1113, an application determining sub-unit 1114, and a security level determining sub-unit 1115.

Instruction determining sub-unit 1111 is configured to determine whether the frequency of the security-sensitive instruction executed by the checked processor 01 so far is equal to or longer than a preset threshold.

Input/output operation determining sub-unit 1112 is configured to determine whether the frequency of the security-sensitive input/output operation executed by the checked processor 101 so far is equal to or longer than a preset threshold.

Processor running mode determining sub-unit 1113 is configured to determine whether the checked processor 101 is currently running in the processor running mode.

Application determining sub-unit 1114 is configured to determine whether the security-sensitive application is currently running on the checked processor.

Security level determining sub-unit 1115 is configured to determine whether the current security level of the checked processor 101 belongs to the user-defined security level.

According to the embodiment of the present disclosure, the checking unit 1120 detects the checked processor 101 in a first checking manner or a second checking manner according to the determination result.

For the same running process of the checked processor, the total checking length of the first checking mode is longer than the total checking length of the second checking mode, in particular, for example, for the same running process of the checked processor, the length of at least one check of the first checking mode may be longer than that of the second checking mode; and/or for the same running process of the checked processor, the number of checks of the first checking mode may be longer than that of the second checking mode.

Alternatively, when the checked processor 101 satisfies the security-sensitive condition, the checking length of the current check may be prolonged; and/or when the checked processor 101 satisfies the security-sensitive condition, the number of checks of the checked processor 101 may be increased during the same running process of the checked processor 101.

According to the embodiment of the present disclosure, the user may freely determine the specific checking pattern of the first checking mode and the specific checking pattern of the second mode as needed, as long as for the same running process of the checked processor, the total checking length of the first checking mode is longer than the total checking length of the second checking mode, so as to realize targeted checking of the running stage with a high threat to the running security of the checked processor 101.

It may be understood that the determining unit 1110, the checking unit 1120, the instruction stream acquiring unit 1130, and the Trojan guard unit 1140 may be combined into one module, or any one of the modules may be split into multiple modules. Alternatively, at least some of the functionality of one or more of these modules may be combined with at least some of the functionality of the other modules and implemented in one module. According to an embodiment of the present disclosure, at least one of the determining unit 1110, the checking unit 1120, the instruction stream acquiring unit 1130, and the Trojan guard unit 1140 may be at least partially implemented as a hardware circuit such as a field programmable gate array (FPGA), Programmable logic array (PLA), system-on-chip, system on substrate, system on package, application specific integrated circuit (ASIC), or may be implemented in any other reasonable manner of hardware or firmware that integrates or packages the circuits, or may be implemented by software, hardware, firmware, or a combination thereof. Alternatively, at least one of the determining unit 1110, the checking unit 1120, the instruction stream acquiring unit 1130, and the Trojan guard unit 1140 may be at least partially implemented as a computer program module that may perform the function of a corresponding module when the program is run by a computer.

Figure 13:
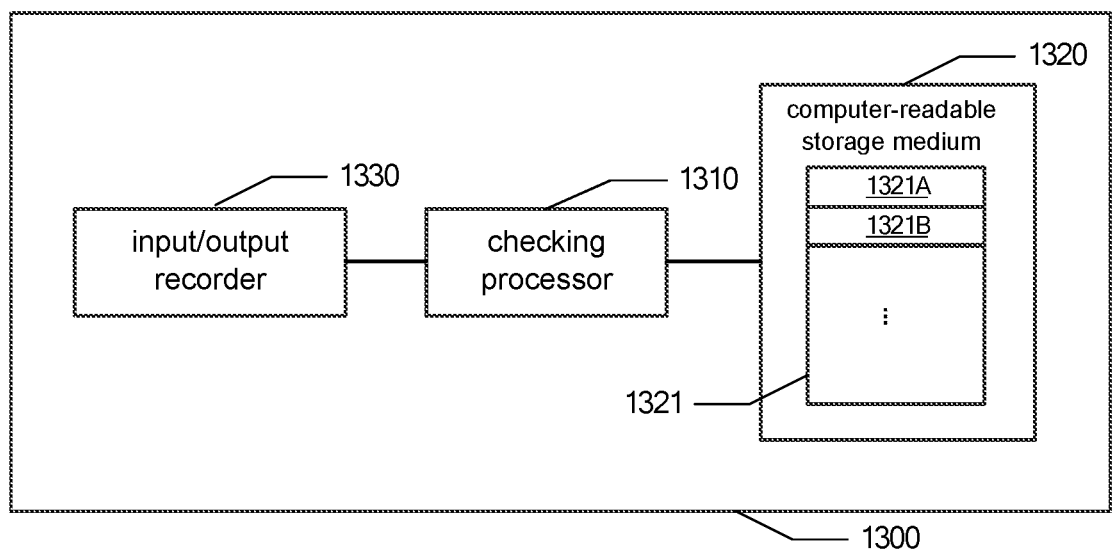
FIG. 13 schematically shows a block diagram of a checking system for a processor according to an embodiment of the present disclosure.

FIG. 13 schematically shows a block diagram of a checking system for a processor 1300 according to an embodiment of the present disclosure.

As shown in FIG. 13, the checking system 1300 includes a checking processor 1310, a computer-readable storage medium 1320, and an input/output recorder 1330. The checking processor 1310 is one of the specific embodiments of the checking processor 105, and the input/output recorder 1330 is one of the specific embodiments of the input/output recorder 105.

The checking system 1300 may perform the method described above with reference to FIGS. 2-10 to detect the checked processor 101.

Specifically, the checking processor 1310 may include, for example, general purpose microprocessors, instruction set processors and/or associated chipsets and/or special purpose microprocessors (e.g., application specific integrated circuits (ASICs)), and the like. The checking processor 1310 may also include an on-board memory for cache usage. The checking processor 1310 may be a single processing unit or a plurality of processing units for performing different actions of the method flow according to the embodiments of the present disclosure described with reference to FIGS. 2-10.

The computer-readable storage medium 1320 may be any medium that may contain, store, communicate, propagate, or transport instructions. For example, readable storage medium may include but are not limited to electrical, magnetic, optical, electromagnetic, infrared, or semiconductor systems, apparatus, devices, or propagation medium. Specific examples of readable storage medium include a magnetic storage device such as a magnetic tape or a hard disk (HDD), an optical storage device such as a compact disc (CD-ROM), a memory such as a random access memory (RAM) or a flash memory, and/or wired/wireless communication link.

Computer-readable storage media 1320 may include a computer program 1321 that may include code/computer-executable instructions that, when executed by checking processor 1310, cause checking processor 1310 to perform, for example, the method flow described above in connection with FIGS. 2-10 and any variations thereof.

Computer program 1321 may be configured with computer program code, including, for example, computer program modules. For example, in an example embodiment, the code in the computer program 1321 may include one or more program modules including, for example, 1321A, a module 1321B, etc. It should be noted that the division manner and the number of modules are not fixed, and those skilled in the art may use appropriate program modules or combination of program modules according to actual situations. When these program module combinations are executed by the checking processor 1310, the checking processor 1310 may perform the method flow described above in connection with FIGS. 2-10 and any variations thereof.

According to the embodiment of the present disclosure, the input/output recorder 1030 is configured to record input and output information of the checked processor 101 during running process. The checking processor 1310 may interact with the input/output recorder 1330 to execute the method flow described above with reference to FIGS. 2-10 and any variations thereof.

According to the embodiment of the present disclosure, at least one of the determining unit 1110, the checking unit 1120, the instruction stream acquiring unit 1130, and the Trojan guard unit 1140 may be implemented as a computer program module described with reference to FIG. 13, which when executed by the checking processor 1310 may implement the respective operations described above.

The above-described methods, devices, units and/or modules according to various embodiments of the present disclosure may be implemented by a computing-capable electronic device that executes software containing computer instructions. The system may include a storage device to implement the various types of storage described above. The computing-capable electronic device may include, but is not limited to, a device capable of executing computer instructions, such as a general purpose processor, a digital signal processor, a special purpose processor, a reconfigurable processor, and the like. Execution of such instructions causes the electronic device to be configured to perform the above-described operations according to the present disclosure. The foregoing devices and/or modules may be implemented in one electronic device or in different electronic devices. The software may be stored in a computer-readable storage medium. The computer-readable storage medium stores one or more programs (software modules) that include instructions that, when executed by one or more processors in an electronic device, cause the electronic device to perform the method of the present disclosure.

These software may be stored in the form of volatile or non-volatile storage (such as storage devices like ROM), whether erasable or rewritable, or stored in the form of memory (e.g., RAM, memory chip, device, or integrated circuit), or stored on an optically readable medium or a magnetically readable medium such as a CD, a DVD, a magnetic disk, a magnetic tape, or the like. It is to be appreciated that storage devices and storage medium are examples of machine-readable storage devices suitable for storing one or more programs that include instructions that, when executed, implement the present disclosure. Embodiments provide programs and a machine-readable storage device storing such programs, the programs including code for implementing the device or method according to any one of the claims of the present disclosure. In addition, these programs may be delivered electronically via any medium, such as communication signals carried over a wired connection or a wireless connection. Various embodiments suitably include these programs.

A person skilled in the art may understand that, the features described in the various embodiments and/or claims of the present disclosure may be combined or conjuncted in various ways even if such combinations or conjunctions are not explicitly described in the present disclosure. In particular, various combinations and/or conjunctions of the features described in the various embodiments and/or claims of the present disclosure may be made without departing from the spirit and scope of the present disclosure. All such combinations and/or conjunctions are within the scope of this disclosure.

Although the present disclosure has been shown and described with reference to specific exemplary embodiments thereof, it will be understood by those skilled in the art that various changes in form and detail may be made without departing from the spirit and scope of the disclosure, as defined by the appended claims and their equivalents. Therefore, the scope of the disclosure should not be limited to the above-described embodiments, but should be determined not only by the appended claims but also by equivalents of the appended claims.

What is claimed is:

1. A checking method for a checked processor, comprising:
   determining, by a checking processor, whether the checked processor satisfies a security-sensitive condition including one or more of security-sensitive instruction, processor running mode, security-sensitive input/output operation, security-sensitive application, and user-defined security level, wherein the processor running mode includes an authority level of the checked processor in runtime; and
   checking, by the checking processor, the checked processor according to the determination result during at least a part of one running process of the checked processor, wherein checking the checked processor further comprises:
   when the checked processor satisfies the security-sensitive condition, checking the checked processor according to a first checking mode during at least a first part of said one running process based on a total checking length of the first checking mode; and
   when the checked processor does not satisfy the security-sensitive condition, checking the checked processor according to a second checking mode during at least a second part of said one running process based on a total checking length of the second checking mode;
   wherein for said one running process of the checked processor, the total checking length of the first checking mode is longer than the total checking length of the second checking mode, and the longer the total checking length is, the greater a corresponding checking coverage of the total checking length is, wherein checking the checked processor according to the first checking mode comprises prolonging a checking length of a check of the checked processor by the checking processor, increasing the number of checks of the checked processor during said one running process of the checked processor by the checking processor, or both.

2. The checking method of claim 1, wherein, for said one running process of the checked processor, the total checking length of the first checking mode being longer than the total checking length of the second checking mode comprises:
   for said one running process of the checked processor, the length of at least one check of the first checking mode being longer than that of the second checking mode; and/or
   for said one running process of the checked processor, the number of checks of the first checking mode being longer than that of the second checking mode.

3. The checking method of claim 1, wherein, when the security-sensitive condition comprises security-sensitive instruction, said determining whether the checked processor satisfies security-sensitive condition comprises:
   determining whether the frequency of the security-sensitive instruction executed by the checked processor so far is equal to or longer than a preset threshold.

4. The checking method of claim 1, wherein, when the security-sensitive condition comprises security-sensitive input/output operation, said determining whether the checked processor satisfies security-sensitive condition comprises:
   determining whether the frequency of the security-sensitive input/output operation executed by the checked processor so far is equal to or longer than a preset threshold.

5. The checking method of claim 1, wherein, when the security-sensitive condition comprises processor running mode, said determining whether the checked processor satisfies security-sensitive condition comprises:
   determining whether the checked processor is currently running in the processor running mode.

6. The checking method of claim 1, wherein, when the security-sensitive condition comprises security-sensitive application, said determining whether the checked processor satisfies security-sensitive condition comprises:
   determining whether the security-sensitive application is currently running on the checked processor.

7. The checking method of claim 1, wherein, when the security-sensitive condition comprises user-defined security level, said determining whether the checked processor satisfies security-sensitive condition comprises:
   determining whether the current security level of the checked processor belongs to the user-defined security level.

8. The checking method of claim 1, wherein, before determining whether the checked processor satisfies security-sensitive condition, the method further comprises:
   acquiring instruction stream output by the checked processor;
   said determining whether the checked processor satisfies security-sensitive condition comprises:
   determining whether the checked processor satisfies security-sensitive condition according to the distribution characteristic of the security-sensitive instruction in the instruction stream.

9. The checking method of claim 1, further comprising:
   generating an interference signal in the checked processor when the checked processor is not being checked, so that a Trojan perceptible state in the checked processor not being checked is consistent with a Trojan perceptible state in the checked processor being checked.

10. A checking system, comprising:
    a checking processor;
    an input/output recorder;
    a non-transitory computer readable storage medium stored with programs which, when executed by the checking processor, cause the checking processor to perform operations comprising:

determining, by the checking processor, whether a checked processor satisfies a security-sensitive condition including one or more of security-sensitive instruction, processor running mode, security-sensitive input/output operation, security-sensitive application, and user-defined security level, wherein the processor running mode includes an authority level of the checked processor in runtime; and checking, by the checking processor, the checked processor according to the determination result during at least a part of one running process of the checked processor, wherein checking the checked processor further comprises:

when the checked processor satisfies the security-sensitive condition, checking the checked processor according to a first checking mode during at least a first part of said one running process based on a total checking length of the first checking mode; and when the checked processor does not satisfy the security-sensitive condition, checking the checked processor according to a second checking mode during at least a second part of said one running process based on a total checking length of the second checking mode;

wherein for said one running process of the checked processor, the total checking length of the first checking mode is longer than the total checking length of the second checking mode, and the longer the total checking length is, the greater a corresponding checking coverage of the total checking length is, wherein checking the checked processor according to the first checking mode comprises prolonging a checking length of a check of the checked processor by the checking processor, increasing the number of checks of the checked processor during said one running process of the checked processor by the checking processor, or both.

11. The checking system of claim 10, wherein, for said one running process of the checked processor, the total checking length of the first checking mode being longer than the total checking length of the second checking mode comprises:

for said one running process of the checked processor, the length of at least one check of the first checking mode being longer than that of the second checking mode; and/or for said one running process of the checked processor, the number of checks of the first checking mode being longer than that of the second checking mode.

12. The checking system of claim 10, wherein, said determining whether a checked processor satisfies a security-sensitive condition comprises:

determining whether the frequency of the security-sensitive instruction executed by the checked processor so far is equal to or longer than a preset threshold.

13. The checking system of claim 10, wherein, said determining whether a checked processor satisfies a security-sensitive condition comprises:

determining whether the frequency of the security-sensitive input/output operation executed by the checked processor so far is equal to or longer than a preset threshold.

14. The checking system of claim 10, wherein, said determining whether a checked processor satisfies a security-sensitive condition comprises:

determining whether the checked processor is currently running in the processor running mode.

15. The checking system of claim 10, wherein, said determining whether a checked processor satisfies a security-sensitive condition comprises:

determining whether the security-sensitive application is currently running on the checked processor.

16. The checking system of claim 10, wherein, said determining whether a checked processor satisfies a security-sensitive condition comprises:

determining whether the current security level of the checked processor belongs to the user-defined security level.

17. The checking system of claim 10, the operations performed by the checking processor further comprise:

acquiring instruction stream output by the checked processor;

said determining whether the checked processor satisfies security-sensitive condition comprises:

determining whether the checked processor satisfies security-sensitive condition according to the distribution characteristic of the security-sensitive instruction in the instruction stream.

18. The checking system of claim 10, the operations performed by the checking processor further comprise:

generating an interference signal in the checked processor when the checked processor is not being checked, so that a Trojan perceptible state in the checked processor not being checked is consistent with a Trojan perceptible state in the checked processor being checked.

* * * * *